United States Patent [19]

Fukui

[11] Patent Number: 4,922,283
[45] Date of Patent: May 1, 1990

[54] OPTICAL INSTRUMENT

[75] Inventor: Hajime Fukui, Tokyo, Japan

[73] Assignee: Canon Kabushiki Kaisha, Tokyo, Japan

[21] Appl. No.: 308,014

[22] Filed: Feb. 9, 1989

[30] Foreign Application Priority Data

Feb. 12, 1988 [JP] Japan ................................. 63-030633
Apr. 11, 1988 [JP] Japan ................................. 63-088642

[51] Int. Cl.⁵ .............................................. G03B 7/26
[52] U.S. Cl. ..................................... 354/484; 354/286
[58] Field of Search ............................... 354/286, 484

[56] References Cited

U.S. PATENT DOCUMENTS

4,453,812  6/1984  Suzuki et al. ................... 354/484 X
4,509,846  4/1985  Nakai et al. .................... 354/484 X
4,647,175  3/1987  Bletz et al. ..................... 354/484 X Primary Examiner—L. T. Hix
Assistant Examiner—Brian W. Brown
Attorney, Agent, or Firm—Fitzpatrick, Cella, Harper & Scinto

[57] ABSTRACT

An optical instrument system has an optical instrument body and an optical accessory instrument. The optical instrument body is capable of accommodating an electric power source and includes a supply circuit for supplying an electric power from the electric power source and a body side circuit for performing digital information communication. The optical accessory instrument is attachable to and detachable from the optical instrument body and includes an electric power receiving circuit for receiving an electric power from the supply circuit when attached to the optical instrument body, an accessory side circuit for performing digital information communication with the body side circuit, the accessory side circuit being arranged to change over between a first state of consumption of electric current and a second state of a lower consumption of electric current than in the first state, and a control circuit for controlling the state concerning the consumption of electric current of the accessory side circuit, the control circuit being arranged to change the state from the second state to the first state after a digital communication has been performed between the body side circuit and the accessory side circuit when the electric power has been supplied to the accessory side circuit.

34 Claims, 5 Drawing Sheets

DCLK-D — SYNCHRONIZING CLOCK PULSE

FIG.3b

DCL-D — COMMAND OR DATA FROM CAMERA BODY

FIG.3c

DLC-D — DATA FROM LENS

OPTICAL INSTRUMENT

BACKGROUND OF THE INVENTION

1. Field of the Invention

This invention relates to optical instruments such as cameras or lenses and, more particularly, to an optical instrument having an electronic circuit such as a microcomputer incorporated therein.

2. Description of the Related Art

Recently, high grade electronic technology has found use in cameras serving as the optical instrument. Such a camera contains a microcomputer and a great number of electronic circuits. Hence, rather than calling it the optical instrument, it would be apposite to call it an "electronic instrument".

In particular, as automatic focusing prevails, the high grade of electronic technology is applied to the control system of the camera. Among the recently developed single lens reflex cameras, there are ones in which not only the camera body but also the interchangeable lens has a microcomputer and an electric motor, as, for example, disclosed in U.S. patent application Ser. Nos. 014,021 filed Feb. 12, 1987, 136,732 filed Dec. 12, 1987, 012,862 filed Feb. 10, 1987, 136,976 filed Dec. 23, 1987, 877,264 filed June 23, 1986, 915,019 filed Oct. 3, 1986, and 016,653 filed Feb. 19, 1987. In the cameras of the character described above (the interchangeable lens contains its own electronic circuits including the microcomputer and its own motors), for example, that of U.S. patent application Ser. No. 136,976, provision for the electrical energy supply to the motors and the microcomputer or the electronic circuits in the interchangeable lens is made by the camera body. The interior of that camera body, therefore, accommodates an electric power source or battery for supplying a current to the motors and a constant voltage device for supplying a current to the electronic circuits. In this camera, the completion of the coupling operation of the interchangeable lens to the camera body immediately starts an electric current being supplied from the constant voltage device in the camera body to the microcomputer in the interchangeable lens, thereupon rendering the microcomputer operative. Meanwhile, the power delivery system for the connection from the power source or battery in the camera body to the various motors in the interchangeable lens is made to operate in such a manner that after the normal coupling of the interchangeable lens to the camera body has been detected and information has normally been communicated between the camera body and the interchangeable lens, an electric current is then permitted to flow through the power delivery system.

In the above-described camera, because it is after the establishment of the normal coupling of the interchangeable lens to the camera body and the start of the normal communication of information between them that an electric power current flows to the power delivery system, there is no possibility of occurrence of wasteful electric current flow to the power delivery system. However, to the microcomputer in the interchangeable lens, regardless of whether or not information is normally being communicated between the interchangeable lens and the camera body, an electric current of relatively large intensity is caused to flow. Even in the substantially unusable state of the camera (for example, the state of abnormal coupling of the interchangeable lens to the camera body, or the state of occurrence of an accident or insufficiency of the insulation or poor connection in the information communication system between the camera body and the interchangeable lens), therefore, a relatively large current continues flowing to the microcomputer in the interchangeable lens. As a result, there is a problem of premature consumption of the battery in the camera body.

SUMMARY OF THE INVENTION

One aspect of this invention is to provide an optical instrument comprising keeping means for keeping electronic circuits in the optical instrument in a state of low consumption of electric current, thereby making it possible to reduce the consumption of energy of the battery to a lower level when in the substantially unusable state than ever before.

BRIEF DESCRIPTION OF THE DRAWINGS

FIG. 4.

DETAILED DESCRIPTION OF THE PREFERRED EMBODIMENTS

The invention is next described in connection with embodiments thereof applied to the interchangeable lens for the lens-interchange type camera with reference to the drawings.

Figure 1:
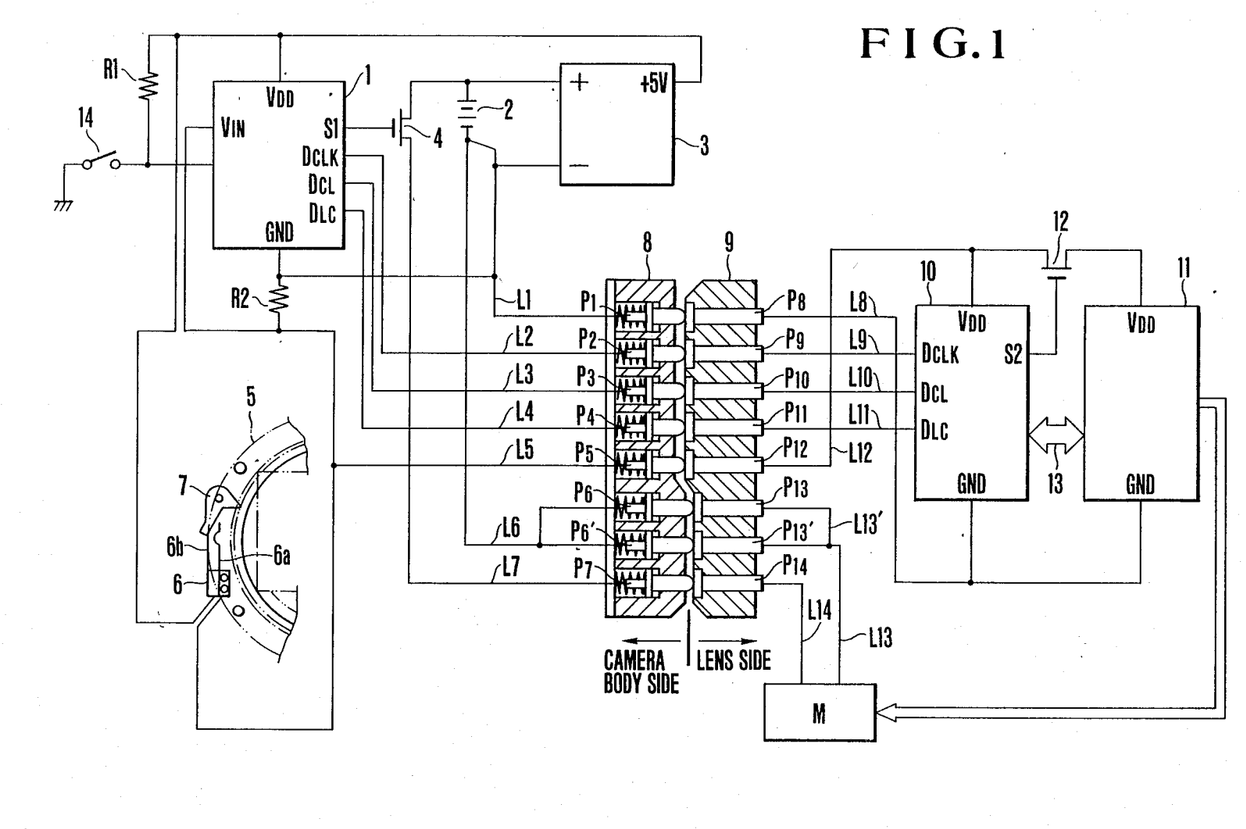
FIG. 1 is a diagram illustrating the electrical circuit arrangements in an interchangeable lens and a camera body, constituting an embodiment of a camera according to the invention.

In FIG. 1, an electronic circuit 1 is installed in the camera body serving as an optical instrument body. The same camera body accommodates an electric power source 2 such as a battery. A constant voltage circuit 3 is supplied with an electric current from the power source 2 and functions as an electric power source for both the aforesaid electronic circuit 1 and another electronic circuit which lies in the lens serving as an optical accessory instrument to be described later. An analog switch 4 switches on and off supply of a current to a motor device M mounted in the lens. 5 is a lens-attaching mount provided on the camera body. A lens-attaching detection switch 6 is arranged in an input signal line path of the electronic circuit 1 and arranged adjacent to the lens-attaching mount 5. A lens-attaching and -detaching response member 7 actuates the lens-attaching detection switch 6. The lens-attaching and -detaching response member 7 is a swingable member which is pivotally mounted on the back side of the lens-attaching mount 5 and has two armed portions on either side of its pivot point, one of which is moved when pushed in engagement with a portion of a camera-attaching mount of the lens, and the other of which presses a contact piece 6b of the lens-attaching detection switch 6.

The lens-attaching detection switch 6 has two contact pieces 6a and 6b spaced apart from each other when the lens is detached from the camera body. When the lens is attached to the camera body, the two contact pieces 6a and 6b come into contact with each other, thereby connecting an input terminal $V_{IN}$ of the electronic circuit 1 to the output terminal of the constant voltage circuit 3.

8 is a connection terminal carrier for wiring connection, arranged in a lower inner peripheral area of the lens-attaching mount 5. In the connection terminal carrier 8, there are provided a large number of connection terminals (or contact pins) $P_1$-$P_7$ to abut on the respective connection terminals (or electrical contacts) provided on the lens side. Each of these connection terminals $P_1$-$P_7$ is urged by a spring to project from the front surface of the terminal carrier 8 toward the front. Further, the connection terminals $P_1$-$P_7$ are individually connected respectively to wiring lines $L_1$-$L_7$ provided on a printed circuit board arranged in the camera body.

The wiring line $L_1$ connected to the connection terminal $P_1$ is to be connected to a ground line of the lens side electronic circuit to be described later. The wiring line $L_1$ is connected to a ground terminal GND of the camera body side electronic circuit 1 and the negative pole of the battery 2.

The wiring lines $L_2$-$L_4$ connected to the connection terminals $P_2$-$P_4$ are signal lines through which signals are given and received between the electronic circuit 1 on the camera body side and the electronic circuit on the lens side. The wiring line $L_2$-$L_4$ are connected to the respective signal terminals of the electronic circuit 1.

The wiring line $L_5$ connected to the connection terminal $P_5$ is a power source line for lens IC connected to the lens-attaching detection switch 6 and an input terminal $V_{IN}$ of the electronic circuit 1. Also, the wiring line $L_6$ connected to the connection terminals $P_6$ and $P_6'$ is a power ground line for the motor device M on the lens side. The wiring line $L_6$ is connected to the negative pole of the electric power source 2.

The wiring line $L_7$ connected to the connection terminal $P_7$ is a motor power line for supply of a current from the power source 2 in the camera body to the motor device M in the lens. In this wiring line $L_7$, as has been described above, there is provided the analog switch 4. Incidentally, $R_1$ and $R_2$ are resistors.

14 is a switch arranged to turn on when, for example, a shutter button (not shown) is depressed to a first stroke. By the first stroke of the shutter button, the camera performs a light measuring operation, and a shutter time and an aperture value are displayed on an external display device (not shown).

It should be noted that instead of using the shutter button on operation to present that display on the external display device, another operating member irrelevant to the shutter button may be used on operation to present the aperture value, the shutter time, etc. on the external display device.

In the interchangeable lens (that is, an optical accessory instrument) constructed attachably to and detachably from the camera body, as described above, a microcomputer 10, a control IC 11 for controlling a motor for focus driving and another motor for diaphragm driving, and an analog switch 12 for switching on and off supply of a current to the IC 11 are incorporated. The casing of the lens is provided with a camera-attaching mount (not shown) to be detachably coupled with the lens-attaching mount 5 on the camera body side, and a connection terminal carrier 9 arranged in a lower peripheral area of the camera-attaching mount to confront the connection terminal carrier 8 on the camera body side.

The connection terminal carrier 9 provided on the interchangeable lens side has eight connection terminals $P_8$-$P_{14}$ which are able to come into contact with the connection terminals $P_1$-$P_7$ when the mount attachment is complete. These connection terminals $P_8$-$P_{14}$ are connected to wiring lines $L_8$-$L_{14}$, respectively.

The wiring line $L_8$ connected to the connection terminal $P_8$ is connected to the microcomputer 10 on the lens side and the ground terminal of the control IC 11, and is to be connected through the connection terminals $P_8$ and $P_1$ to the wiring line $L_1$ on the camera body side, thus constituting a signal ground line for the electronic circuit system.

The wiring lines $L_9$-$L_{11}$ are connected to the respective signal terminals of the microcomputer 10 and individually to the respective connection terminals $P_9$-$P_{11}$ and are to be connected through the connection terminals $P_2$-$P_4$ on the camera body side to the respective wiring lines $L_2$-$L_4$ on the camera body side. That is, the wiring lines $L_9$-$L_{11}$ constitute the signal lines on the lens side.

The data sent from the electronic circuit 1 is transmitted through the line $L_3$, connection terminal $P_3$, connection terminal $P_{10}$ and line $L_{10}$ and is received by the microcomputer 10, while the data sent from the microcomputer 10 is transmitted through the line $L_{11}$, connection terminal $P_{11}$, connection terminal $P_4$ and line $L_4$ and is received by the electronic circuit 1.

Again the electronic circuit 1 sends a clock pulse for establishing synchronism in serial communication with the microcomputer 10. The clock pulse is transmitted through the line $L_2$, connection terminal $P_2$, connection terminal $P_9$ and line $L_9$ to the microcomputer 10.

The wiring line $L_{12}$ connected to the connection terminal $P_{12}$ is provided to supply a current both to the microcomputer 10 and to the control IC 11 through the analog switch 12, thus constituting a power source line for the electronic circuit system. For this purpose, the line $L_{12}$ is connected to the power source terminal $V_{DD}$ of the microcomputer 10 and through the analog switch 12 to the power source terminal $V_{DD}$ of the control IC 11, and is to be connected through the connection terminals $P_{12}$ and $P_5$ to the line $L_5$ on the camera body side.

The wiring lines $L_{13}$ and $L_{13}'$ and the wiring line $L_{14}$ are connected to the motor device M serving as a motor for driving the focusing lens and a motor for driving the diaphragm, constituting the power lines for allowing a large current as compared with the other lines $L_8$-$L_{12}$ to flow therethrough. The lines $L_{13}$ and $L_{13}'$ are power ground lines, and the line $L_{14}$ is a power source line.

The line $L_{13}$ is to be connected through the two parallel connections of the terminals $P_{13}$, $P_{13}'$ and $P_6$, $P_6'$ to the wiring line $L_6$ on the camera body side. The line $L_{14}$ is to be connected through the connection terminals $P_{14}$ and $P_7$ to the wiring line $L_7$ on the camera body side.

The microcomputer 10 is connected to the control IC 11 through a bus line 13. The microcomputer 10 controls the control IC 11 through the bus line 13.

Figure 2:
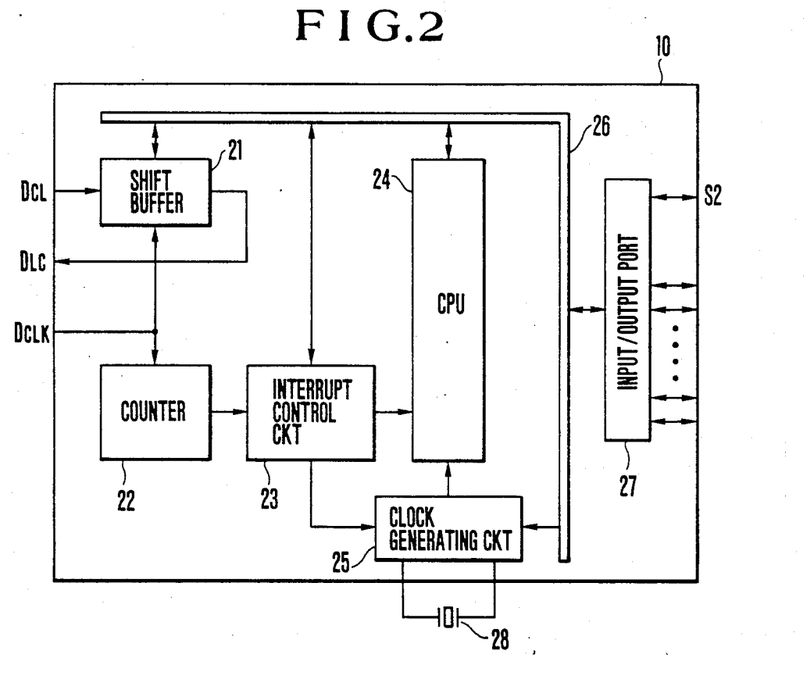
FIG. 2 is a schematic diagram of those parts of the microcomputer and electronic circuits incorporated in the interchangeable lens for the camera shown in FIG. 1 which are relevant to the invention.

FIG. 2 shows the construction of the microcomputer 10 on the lens side and the construction of the keeping means for keeping a low consumption-of-current state, constituting an essential part of the invention.

In FIG. 2, there are an 8-bit shift buffer 21, a 3-bit binary counter 22, an interrupt control circuit 23, a CPU 24, a clock generating circuit 25, an internal bus 26, an input/output port 27, and an oscillator 28.

The shift buffer 21 has an input terminal $D_{CL}$ connected to the line $L_{10}$, an output terminal $D_{LC}$ connected to the line $L_{11}$ and a clock terminal $D_{CLK}$ connected to the line $L_9$, and is connected through the internal bus 26 to the CPU 24. The data $D_{CL}.D$ having a waveform shown in FIG. 3 sent from the electronic circuit 1 on the camera body side is transmitted through the line $L_{10}$ to the shift buffer 21. In synchronism with the synchronizing clock pulse $D_{CLK}.D$ (see FIGS. 3a–3c) sent from the electronic circuit 1 through the line $L_9$, the shift buffer 21 receives the data $D_{CL}.D$. Meanwhile, the data $D_{LC}.D$ already written in the shift buffer 21 (the data to be sent from the lens side to the camera body side, see FIGS. 3a–3c) is read out and output to the output terminal $D_{LC}$ of the shift buffer 21 in synchronism with the clock pulse $D_{CLK}.D$, and then transmitted through the line $L_{11}$ and the line $L_4$ to the electronic circuit 1 on the camera body side. Since the shift buffer 21 is connected to the CPU 24 through the internal bus 26, it is so constructed as to perform reading and writing of the data according to the command from the CPU 24.

The 3-bit binary counter 22 is supplied with the synchronizing clock pulse $D_{CLK}.D$ sent from the electronic circuit 1 on the camera body side through the line $L_2$ and the line $L_9$. When having counted 8 pulses of this clock pulse, the counter 22 produces a carry which is applied to the interrupt control circuit 23.

The interrupt control circuit 23 is connected to the internal bus 26 and is arranged to receive a command of allowance of interrupt or prohibition of interrupt from the CPU 24 through the internal bus 26. Based on the previously set order of priority of interrupt and according to that command, the interrupt control circuit 23 generates interrupt, which is transmitted to the CPU 24 and at the same time to the clock generating circuit 25.

The clock generating circuit 25 constitutes an oscillating circuit together with the oscillator 28 connected to the microcomputer 10, the oscillator 28 supplying a synchronizing clock to each part in the microcomputer 10. The clock generating circuit 25 is made to be controlled by the CPU 24 through the internal bus 26, so that when having received a command of stopping oscillation from the CPU 24, the clock generating circuit 25 comes into a "HALT" or "STOP" mode, thus bringing the microcomputer 10 into a state of low consumption of electric current.

27 is an input/output port. The input/output port 27 is connected to the internal bus 26 and is controlled by the CPU 24 through the internal bus 26.

The CPU 24, while performing writing and reading of data and commands to the shift buffer 21 and the input/output port 27 through the internal bus 26, gives commands to the interrupt control circuit 23. The CPU 24, the interrupt control circuit 23 and the clock generating circuit 25 constitute the keeping means (keeping circuit) for keeping the microcomputer 10 in a state of low consumption of electric current for the prescribed period.

Figure 4:
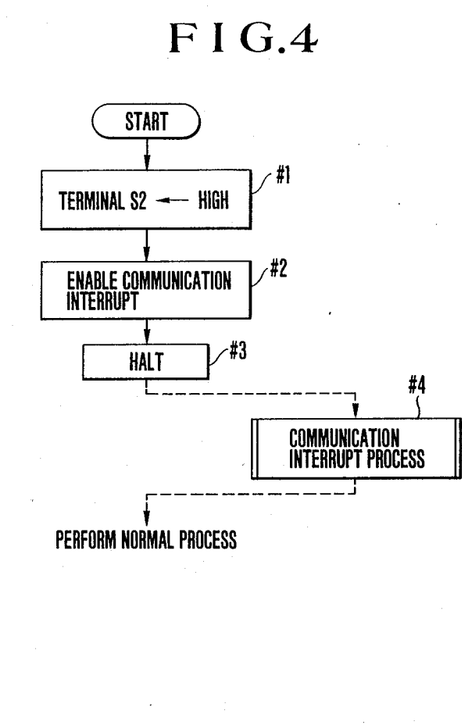
Figure 5:
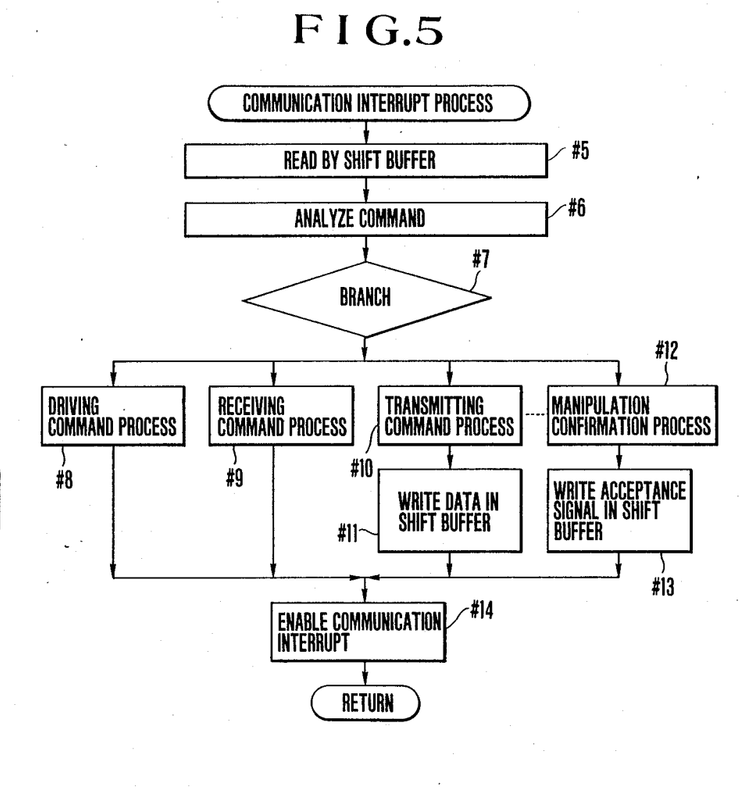
FIG. 5 are flowcharts of programs as a first embodiment which are executed in the electronic circuit shown in FIG. 2.

FIG. 4 and FIG. 5 are flowcharts of programs as a first embodiment which are executed in the CPU 24.

In the following, with reference to FIG. 1 to FIG. 5, the state and operation of each part in the camera of this embodiment are explained.

(I) In a case where the lens is not attached to the camera body:

When the lens is not attached, because the connection terminal carrier 9 on the lens side is separated from the connection terminal carrier 8 on the camera body side, both the connection terminals $P_1$–$P_7$ and $P_{11}$–$P_{14}$ do not come into contact with each other. Also, the lens-attaching detection switch 6 provided in the lens-attaching mount 5 of the camera body is in a state in which, as shown in FIG. 1, its two contact pieces 6a and 6b are separated from each other. Therefore, the input terminal $V_{IN}$ of the electronic circuit 1 is connected through the pressure reduction resistor $R_2$ to the negative pole of the battery 2, and is supplied with the voltage of low level close to the ground voltage. Also, the electronic circuit 1 produces a voltage of high level for making the analog switch 4 to turn off (open) at the output terminal S1. Therefore, the analog switch 4 becomes off. Thus, the battery 2 and the connection terminal $P_7$ are cut off from each other.

(II) In a case where the lens is attached to the camera body in a normal state:

When the lens is completely coupled with the lens-attaching mount 5 of the camera body, the contact of the connection terminals $P_1$–$P_7$ on the camera body side with the connection terminals $P_8$–$P_{14}$ on the lens side, as shown in FIG. 1, is established. Hence the wiring lines $L_1$–$L_7$ on the camera body side are respectively connected to the wiring lines $L_8$–$L_{14}$ on the lens side through the connection terminals $P_1$–$P_{14}$. It results in the completion of such wiring connections as shown in FIG. 1. (However, in FIG. 1, although the lens-attaching detection switch 6 is depicted as in the open state, it is at the time of completion of the lens coupling that the switch 6 holds the closing state.)

When the lens is coupled with the camera body, the camera-attaching mount of the lens is rotated relative to the lens-attaching mount 5 of the camera body in a clockwise direction as viewed in FIG. 1. Therefore, the lens-attaching and -detaching response member 7 is turned about its pivot point in the counterclockwise direction. Accordingly, the contact piece 6b of the lens-attaching detection switch 6 is pushed by one armed portion of that lens-attaching and -detaching response member 7, so that both the contact pieces 6a and 6b of the detection switch 6 come into contact with each other. Thus, the switch 6 turns on. Therefore, the 5 V output terminal of the constant voltage circuit 3 is brought into connection with the input terminal $V_{IN}$ of the electronic circuit 1 through the switch 6. Then, an input voltage of high level (5 volts) is applied to the input terminal $V_{IN}$. At the same time, the electric power source is set in connection with the microcomputer 10 on the lens side through the lines $L_5$, $P_5$, $P_{12}$ and $L_{12}$. By connecting the electric power source to the microcomputer 10, the CPU 24 becomes operable, starting execution of the program shown in the flowcharts of FIG. 4 and FIG. 5.

(Step #1)

Upon supply of electric power to the microcomputer 10, the CPU 24 starts to operate. As a first step, the CPU 24 changes the output level of one output port S2 of the input/output port 27 to a high level "H", so that the analog switch 12 is turned off. Therefore, the camera is set in a state in which no current is supplied to the control IC 11.

(Step #2)

A command for allowing production of a communication interrupt is sent to the interrupt control circuit 23, so that it is made possible to receive signals sent from the camera body side.

(Step #3)

A command for stopping the oscillation of the clock generating circuit 25 is supplied to the clock generating circuit 25 through the internal bus 26. Therefore, the microcomputer 10 is kept in a state of low consumption of electric current called "HALT" or "STOP".

(Step #4 (Communication interrupt process))

Figure 3A:
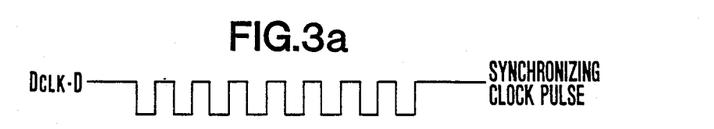
FIGS. 3a-3c shows wave forms of signals traveling between the camera body and the interchangeable lens in the arrangement shown in FIG. 1 and FIG. 2.
Figure 3B:
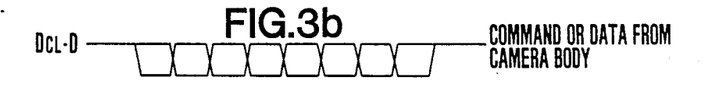
Figure 3C:
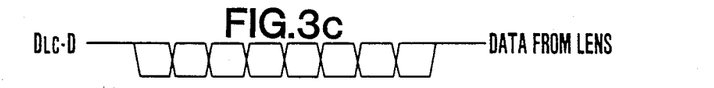

If the attachment of the lens to the camera body is normal, and every wiring line and connection terminal are normal, then the synchronizing clock pulse $D_{CLK}.D$ (FIG. 3) and the command or data $D_{CL}.D$ (FIG. 3) are transmitted through the respective wiring lines $L_2$, $L_3$, $L_9$ and $L_{10}$ to the microcomputer 10 on the lens side. That synchronizing clock pulse $D_{CLK}.D$ is supplied to the shift buffer 21 and the 3-bit binary counter 22. That command or data $D_{CL}.D$ is supplied to the input terminal of the shift buffer 21.

When that clock pulse $D_{CLK}.D$ is supplied to the 3-bit binary counter 22, the counter 22 starts to count. At a time when having counted the 8 pulses, the counter 22 produces a carry. This carry is supplied to the interrupt control circuit 23. Since, at this time, the interrupt control circuit 23 has already been set to enable the communication interrupt by the CPU 24, when that carry is supplied from the counter 22, an instruction of the interrupt generation is given to the clock generating circuit 25. When receiving this instruction as a trigger, the clock generating circuit 25 starts to oscillate in cooperation with the oscillator 28. The clock generated by the circuit 25 is supplied to the CPU 24 and other parts in the microcomputer 10. Thus, the above-described state of low consumption of electric current is released, and a transit to the normal operating state occurs. Meanwhile, the interrupt control circuit 23 supplies the interrupt generation signal also to the CPU 24, thereby bringing the CPU 24 into a communication interrupt process routine to be described in great detail with reference to FIG. 5.

(Step #5)(See FIG. 5)

The data or command $D_{CL}.D$ sent from the camera body side is read by the shift buffer 21 in synchronism with the clock pulse $D_{CLK}.D$. During this time, data which has already been written in the shift buffer 21 is read out to the output terminal thereof one bit at a time in synchronism with the synchronizing clock pulse $D_{CLK}.D$, and then transmitted therefrom through the lines $L_{11}$ and $L_4$ to the electronic circuit 1 on the camera body side.

In the process routine for communication interrupt which is generated by the completion of one communication corresponding to 8 synchronizing clock pulses, the data or command $D_{CL}.D$ which has first been read by the shift buffer 21 is read out through the internal bus 26 to the CPU 24.

(Step #6, Step #7)

In the CPU 24, that data or command is analyzed. Then, depending on the analysis result, the process proceeds to a branch process routine such as step #8, step #9, step #10, ..., step #12, etc.

(Step #8)

A driving process such as a distance ring driving and a diaphragm driving is performed.

(Step #9)

A process for receiving data such as the amount of movement of the distance ring and the amount of movement of the diaphragm.

(Step #10)

A process for transmitting the lens intrinsic data such as the focal length and the full aperture value to the camera body side is performed.

(Step #11)

The lens intrinsic data of the step #10 is written in the shift buffer 21.

(Step #12)

A process of "manipulation confirmation command" for confirming that the lens has been attached to the camera body in a normal state is performed.

(Step #13)

An "acceptance signal" representing that the "manipulation confirmation signal" of the step #12 has been accepted is written in the shift buffer 21.

The data written in the shift buffer 21 by the step #11 and the step #13 is to be returned to the camera body side through the lines $L_{11}$ and $L_4$ when in the next cycle of communication.

(Step #14)

In order to make it possible to accept the next cycle of communication interrupt, the interrupt control circuit 23 is allowed for the communication interrupt. Thus, the communication interrupt procedure ends.

(III) In a case where the lens is not normally attached to the camera body, or the wiring and interconnection of the information communicating system between the camera body and the lens has become insufficient in insulation or contact:

In this case, even if the electric power source is connected to the microcomputer 10 in the lens side, the normal data and command are not transmitted from the electronic circuit 1 on the camera body side to the microcomputer 10. Therefore, the microcomputer 10 is kept in a state in which the clock generating circuit 25 is stopped from oscillating by the work of the CPU 24 incorporated in itself. As a result, the microcomputer 10 is kept in a state of low consumption of electric current. Thus, there is no possibility of occurrence of a wasteful consumption of electric power.

As has been described above, in the first embodiment, the keeping means for keeping the state of low consumption of electric current is provided operate in such a manner that even if the optical accessory instrument is in attachment to the body of the optical instrument, it is for an interval up to the start of the normal information communication that the consumption of electric power of the electronic circuit such as the microcomputer in the optical accessory instrument is kept at a lower level than the normal level, thereby giving an advantage that the wasteful consumption of electric power by that electronic circuit does not occur. Hence, premature consumption of electric energy of the battery can be prevented.

Figure 6:
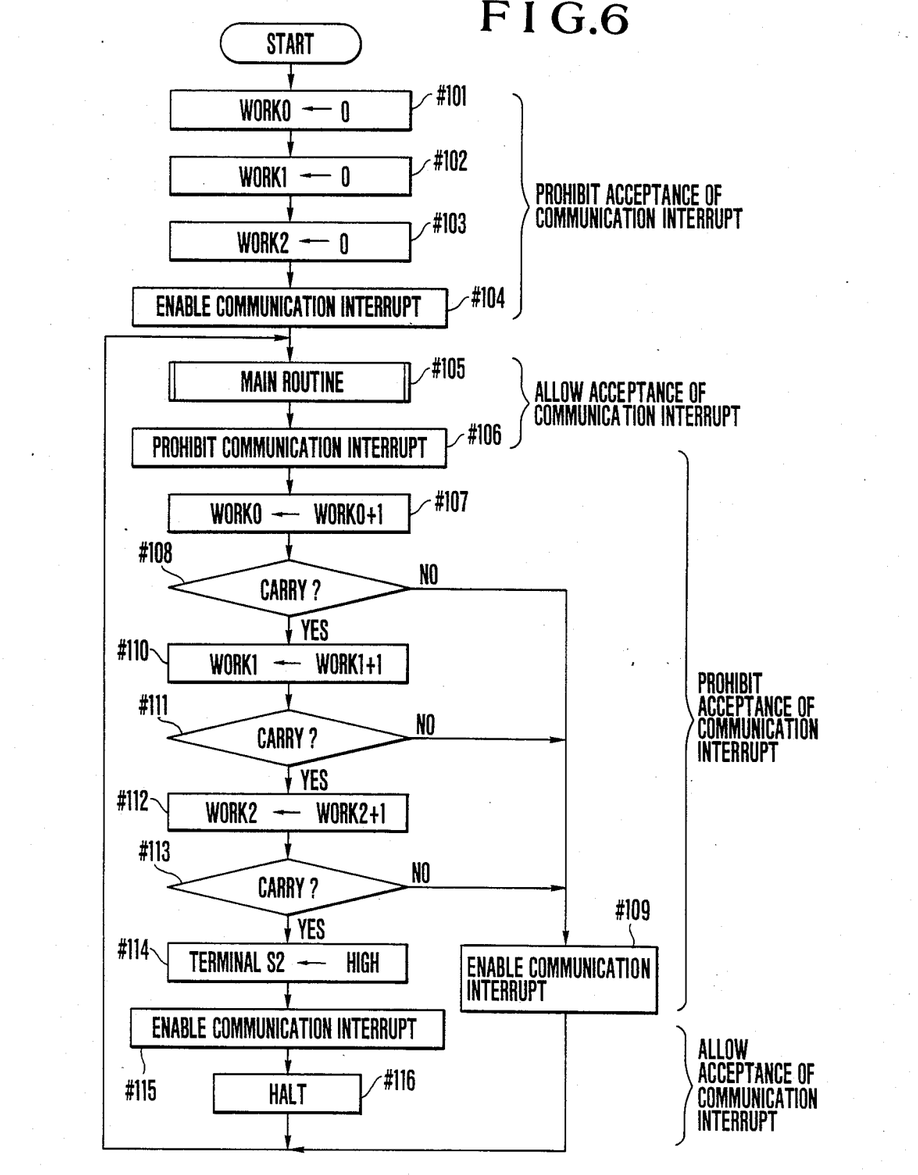
FIG. 6 and FIG. 7 are flowcharts as a second embodiment.
Figure 7:
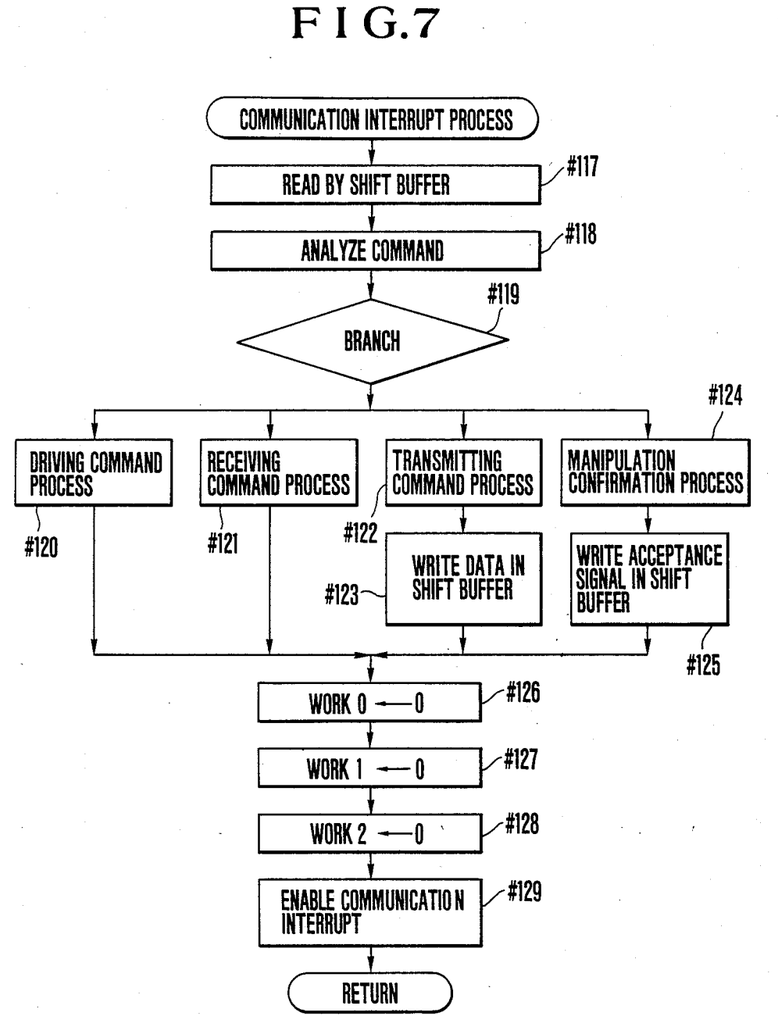

Next, with reference to FIG. 6 and FIG. 7, a second embodiment is described. It should be noted that in the second embodiment, the content of the FIG. 1 to FIG. 3 also applies.

FIG. 6 and FIG. 7 are flowcharts of programs which are executed in the CPU 24. Explanation on the content of these flowcharts will be given later.

Next, by reference to FIG. 1 to FIGS. 3a-3c and FIG. 6, FIG. 7, the electrical interconnection state and the manner in which the microcomputer 10 operates in a state in which the interchangeable lens is attached to the camera body are explained.

(I) In a case where the lens is not attached to the camera body:

When the lens is not attached, because the connection terminal carrier 9 on the lens side is separated from the connection terminal carrier 8 on the camera body side, both the connection terminals $P_1-P_7$ and $P_{11}-P_{14}$ do not come into contact with each other. Also, the lens-attaching detection switch 6 provided in the lens-attaching mount 5 of the camera body is in a state in which, as shown in FIG. 1, its two contact pieces 6a and 6b are separated from each other. Therefore, the input terminal $V_{IN}$ of the electronic circuit 1 is connected through the pressure reduction resistor $R_2$ to the negative pole of the battery 2, and is supplied with the voltage of low level close to the ground voltage. Also, the electronic circuit 1 produces a voltage of high level for making the analog switch 4 to turn off (open) at the output terminal S1. Therefore, the analog switch 4 becomes off. Thus, the battery 2 and the connection terminal $P_7$ are cut off from each other.

(II) In a case where the lens is attached to the camera body in a normal state:

When the lens is completely coupled with the lens-attaching mount 5 of the camera body, the contact of the connection terminals $P_1-P_7$ on the camera body side with the connection terminals $P_8-P_{14}$ on the lens side, as shown in FIG. 1, is established. Hence the wiring lines $L_1-L_7$ on the camera body side are respectively connected to the wiring lines $L_8-L_{14}$ on the lens side through the connection terminals $P_1-P_{14}$. It results in the completion of such wiring connections as shown in FIG. 1. (However, in FIG. 1, although the lens-attaching detection switch 6 is depicted as in the opening state, it is at the time of completion of the lens coupling that the switch 6 holds the closing state.)

When the lens is coupled with the camera body, the camera-attaching mount of the lens is rotated relative to the lens-attaching mount 5 of the camera body in a clockwise direction as viewed in FIG. 1. Therefore, the lens-attaching and -detaching response member 7 is turned about its pivot point in the counterclockwise direction. Accordingly, the contact piece 6b of the lens-attaching detection switch 6 is pushed by one armed portion of that lens-attaching and -detaching response member 7, so that both the contact pieces 6a and 6b of the detection switch 6 come into contact with each other. Thus, the switch 6 turns on. Therefore, the 5 V output terminal of the constant voltage circuit 3 is brought into connection with the input terminal $V_{IN}$ of the electronic circuit 1 through the switch 6. Then, an input voltage of high level (5 volts) is applied to the input terminal $V_{IN}$. At the same time, the electric power source is set in connection with the microcomputer 10 on the lens side through the lines $L_5$, $P_5$, $P_{12}$ and $L_{12}$. When the electric power source is set in connection to the microcomputer 10, the microcomputer 10 performs initialization such as clearing the memory, etc. and then makes it possible to accept the communication interrupt from the camera body, thus ending the initialization process. Meanwhile, the electronic circuit 1 on the camera body side due to the application of an input voltage of high level to the aforesaid input terminal $V_{IN}$ confirms that the lens has been attached, and a communication of the manipulation confirmation to the lens is carried out through the lines $L_2-L_4$ between the camera body and the lens.

The communication is carried out serially as one data is of 8 bits as shown in FIGS. 3a-3c. That is, from the electronic circuit 1 on the camera body side to the lens, the synchronizing clock pulse $D_{CLK}.D$ is put to the line $L_2$ and, in synchronism with this, the command or data $D_{CL}.D$ is output on the line $L_4$. On the lens side, in synchronism with the synchronizing pulse $D_{CLK}.D$, the data $D_{CL}.D$ of the line $L_{10}$ is taken in the shift buffer 21. During this time, the data previously written in the shift buffer 21 is output to the output terminal thereof one bit at a time in synchronism with the pulse $D_{CLK}.D$ and therefrom returned to the camera body side through the lines $L_{11}$ and $L_4$. Also, the synchronizing clock pulse $D_{CLK}.D$ is supplied to the 3-bit counter 22. The counter 22, when having counted 8 pulses, produces a carry to the interrupt control circuit 23. Responsive to this carry, the interrupt control circuit 23 indicates generation of an interrupt to the CPU 24 and the clock generating circuit 25. At this time, the CPU 24 transfers its operation to the communication interrupt process routine and reads the content of the shift buffer 21 through the internal bus 26. It then decodes its content and executes the corresponding instruction to the command. It should be noted that the initial communication which occurs when the lens is attached to the camera body is to transmit the "manipulation confirmation command" for confirming that the lens has normally been attached to the camera body from the camera body side. The next communication is to return the prescribed "acceptance signal" from the lens side to the camera body side. For this purpose, the CPU 24 writes the "acceptance signal" in the shift buffer 21, and the communication interrupt procedure ends.

After the initial communication has been done, in order to receive the "acceptance signal" for confirming that the lens has normally been attached, the electronic circuit 1 on the camera body side sends a dummy command to the lens in the above-described procedure, and examines whether or not the signal on the returned data $D_{LC}.D$ at that time is the "acceptance signal". If so, then it drops the output at the terminal S1 from the high level to the low level, which causes the analog switch 4 to turn on. Thus, the plus terminal of the battery 2 is electrically connected to the line $L_7$.

(III) In a case where the lens is not normally attached to the camera body:

For example, if the terminals connected to the communication lines $L_3-L_5$ and $L_{10}-L_{12}$ between the camera body and the lens, namely, the terminals $P_2$, $P_9$, or $P_3$, $P_{10}$, or $P_4$, $P_{11}$, are in such poor contact that the normal communication can not be carried out. Even in such a situation, as has been described above, when the lens is attached to the camera body, the lens-attaching detection switch 6 is rendered conducting to supply electric power to the electronic circuit on the lens side. But if no communication takes place for more than a predetermined time, then the microcomputer 10 judges this as occurrence of an accident in the communication system and sets the output terminal S2 at a high level, thereby turning off the analog switch 12 to stop the supply of electric current to the control IC 11. Then, the communication interrupt from the camera is enabled, the oscillator 28 is stopped from further oscillating. Thus, the state of low consumption of electric current called "HALT" or "STOP" is set in. Accordingly, the battery of the camera body is prevented from being wastefully consumed even if poor contact of the terminals has taken place.

It should be noted that when the contact is insufficiency is removed, because of being ready to accept the communication interrupt and being in the state of low consumption of electric current, by accepting the communication from the camera body, the oscillator 28 starts to oscillate. Thus, the camera returns to the normal state.

The above-described operations of the circuitry are performed by executing the instruction of the flowcharts of FIG. 6 and FIG. 7.

In the following, the content of the flowcharts of FIG. 6 and FIG. 7 is explained. Incidentally, in FIG. 6 and FIG. 7, WORK0, WORK1, WORK2 represent 4-bit memory areas of a RAM (not shown) in the microcomputer 10.

(Steps #101-#103)

When the electric power source is supplied to the microcomputer 10 an the lens side, the microcomputer 10 clears the WORK0-WORK2 as an initialization process.

(Step #104)

The interrupt control circuit 23 is allowed to generate a communication interrupt. Thus the initialization process ends.

(Step #105)

Upon completion of the initialization process, the main routine is repeatedly executed. In the main routine, a control of the motor for automatic focusing, etc. are carried out in response to commands from the camera body.

(Step #106)

The communication interrupt is prohibited so that in the step #107 and those that follow, the number-of-times counter (WORK0-WORK2) on the RAM is operated.

(Steps #107, #108)

If, as the WORK0 is incremented, a carry has appeared, (15 43 0 has occurred), the process advances to a step #110. If otherwise, the process advances to a step #109.

(Step #109)

If no carry is produced in the step #107, the communication interrupt is enabled and the process returns to the main routine #105.

(Step #110, #111)

If, as the WORK1 is incremented, a carry has appeared, the process advances to a step #112. If otherwise, the process advances to a step #109.

(Step #112, #113)

If, as the WORK2 is incremented, a carry has not appeared, the process advances to the step #109. If the carry has appeared, the process advances to step #114.

(Step #114)

The advance up to the step #114 implies that during a time when the main routine has executed 1000H times (4096 times), the camera body and the lens have never communicated with each other. That is, on the assumption that the deal time of the main routine is about 1 ms, no communication takes place for about 4 seconds between the camera body and the lens. Therefore, on judgment of the fact that something abnormal has occurred in the communication system between the camera body and the lens, the camera is switched to the low consumption-of-current mode. For this purpose, the output of the terminal S2 of the input/output port 27 is set at a high level to stop the supply of electric power to the control IC 11.

(Step #115)

The communication interrupt from the camera body is enabled.

(Step #116)

The oscillator 28 is stopped from oscillating to operate in the low consumption-of-current mode.

Steps #117-#129 represent a communication interrupt process routine.

(Step #117)

As the communication interrupt occurs, the process transfers to the communication interrupt process routine, thereby causing the CPU 24 to read the shift buffer 21.

(Steps #118, #119)

The read command is analyzed, and the flow is branched to one of the process routines depending on the command.

(Step #120)

The driving process such as distance ring driving or diaphragm driving is carried out.

(Step #121)

The process for receiving data such as the moved amount of the distance ring or the moved amount of the diaphragm is carried out.

(Step #122)

The process for transmitting the lens intrinsic data such as the focal length and the full aperture value to the camera body is carried out.

(Step #123)

The lens data of the step #122 is written in the shift buffer 21.

(Step #124)

The treatment of the "manipulation confirmation command" for confirming that the lens has normally been attached to the camera body is carried out.

(Step #125)

The acceptance signal representing that the "manipulation confirmation command" of the step #124 has been accepted is written in the shift buffer 21.

(Steps #126-#128)

The WORK0-WORK2 as the counter for the number of times the main routine has passed are cleared.

(Step #129)

The communication interrupt is enabled, and the communication interrupt procedure ends.

As has been described above, the optical accessory instrument of the second embodiment is provided with means operating in such a manner that in the attached state of the optical accessory instrument of the invention to the camera body, when the information communication between the camera body and the optical accessory instrument has not taken place for more than a predetermined time due to the contact insufficient of the communication contact points, etc. the electronic circuit in that optical accessory instrument, while remaining able to accept the communication, is kept in a state of low consumption of electric current. Therefore, no wasteful consumption of electric power by the above-described electronic circuit takes place. Hence it is made possible to prevent premature consumption of the battery.

It should be noted that the keeping of the electronic circuit of the lens in a state of low consumption of electric current under the condition that it still is able to communicate is effective not only in the case of a problems such as the above-described contact insufficiency, but also when the power switch (not shown) on the camera body side is off, or when shooting has not been done for more than a predetermined time. For these cases, in the first embodiment, the step #9 of FIG. 5, or in the second embodiment, the step #121 of FIG. 7, must be modified such that the command for change-over to the state of low consumption of electric current from the camera body is received and processed and the electronic circuit in the lens is forcedly changed over to the state of low consumption of electric current.

What is claimed is:

1. An optical instrument system comprising:
   (A) an optical instrument body capable of accommodating an electric power source, including:
   (A-1) supply means for supplying an electric power from said electric power source; and
   (A-2) a body side circuit for performing digital information communication; and
   (B) an optical accessory instrument attachable to and detachable from said optical instrument body, including:
   (B-1) electric power receiving means for receiving said electric power from said supply means when attached to said optical instrument body;
   (B-2) an accessory side circuit for performing digital information communication with said body side circuit, said accessory side circuit being arranged to change over between a first state of consumption of electric current and a second state of a lower consumption of electric current than in said first state; and
   (B-3) a control circuit for controlling said state concerning the consumption of electric current of said accessory side circuit, said control circuit being arranged to change said state from said second state to said first state after a digital communication has been performed between said body side circuit and said accessory side circuit when said electric power has been supplied to said accessory side circuit.

2. A system according to claim 1, wherein said control circuit keeps said state in said second state if said digital communication is not performed when said electric power has been supplied to said accessory side circuit.

3. A system according to claim 1, wherein said accessory side circuit includes a computer, said computer being arranged to change over between a first state of consumption of electric current and a second state of a lower consumption of electric current than in said first state.

4. A system according to claim 3, wherein said computer includes a clock signal generating circuit, said second state being obtained by a stoppage state of oscillation of said clock signal generating circuit, and said first state being obtained by a state of oscillation.

5. A system according to claim 1, wherein said optical instrument body further includes detecting means for detecting attachment of said optical accessory instrument, and wherein said supply means includes means responsive to detection of the attachment of said detecting means for starting supply of said electric power to said accessory side circuit.

6. An optical instrument system comprising:
   (A) an optical instrument body capable of accommodating an electric power source, including:
   (A-1) supply means for supplying an electric power from said electric power source; and
   (A-2) a body side circuit for performing digital information communication; and
   (B) an optical accessory instrument attachable to and detachable from said optical instrument body, including:
   (B-1) electric power receiving means for receiving said electric power from said supply means when attached to said optical instrument body;
   (B-2) an accessory side circuit for performing digital information communication with said body side circuit, said accessory side circuit being arranged to change over between a first state of consumption of electric current and a second state of a lower consumption of electric current than in said first state; and
   (B-3) a control circuit for controlling said state concerning the consumption of electric current of said accessory side circuit, said control circuit being arranged to change said state from said first state to said second state when said body side circuit and said accessory side circuit do not perform digital communication for more than a predetermined time.

7. A system according to claim 6, wherein said control circuit returns said state to said first state again when said body side circuit and said accessory side circuit has performed digital communication after said state has been changed to said second state.

8. A system according to claim 6, wherein said accessory side circuit includes a computer, said computer being arranged to change over between a first state of consumption of electric current and a second state of a lower consumption of electric current than in said first state.

9. A system according to claim 8, wherein said computer includes a clock signal generating circuit, said second state being obtained by a stoppage state of oscillation of said clock signal generating circuit, and said first state being obtained by a state of oscillation.

10. A system according to claim 6, wherein said optical instrument body further includes detecting means for detecting attachment of said optical accessory instrument, and wherein said supply means includes means responsive to detection of the attachment of said detecting means for starting supply of said electric power to said accessory side circuit.

11. An optical accessory instrument attachable to and detachable from an optical instrument body having electric power supply means and a body side circuit for performing digital information communication, comprising:
(a) electric power receiving means for receiving an electric power from said electric power supply means when attached to said optical instrument body;
(b) an accessory side circuit for performing digital information communication with said body side circuit, said accessory side circuit being arranged to change over between a first state of consumption of electric current and a second state of a lower consumption of electric current than in said first state; and
(c) a control circuit for controlling said state concerning the consumption of electric current of said accessory side circuit, said control circuit being arranged to change said state from said second state to said first state after a digital communication has been performed between said body side circuit and said accessory side circuit when said electric power has been supplied to said accessory side circuit.

12. An accessory according to claim 11, wherein said control circuit keeps said state in said second state if said digital communication is not performed when said electric power has been supplied to said accessory side circuit.

13. An accessory according to claim 11, wherein said accessory side circuit includes a computer, said computer being arranged to change over between a first state of consumption of electric current and a second state of a lower consumption of electric current than in said first state.

14. An accessory according to claim 13, wherein said computer includes a clock signal generating circuit, said second state being obtained by a stoppage state of oscillation of said clock signal generating circuit, and said first state being obtained by a state of oscillation.

15. An accessory according to claim 11, further comprising:
a motor serving as a drive source for an optical operation, said motor receiving said electric power directly from said electrical power receiving means.

16. An accessory according to claim 15, wherein said accessory side circuit includes a drive circuit for controlling the driving of said motor, and wherein a supply of current to said drive circuit is stopped in said second state.

17. An optical accessory instrument attachable to and detachable from an optical instrument body having electric power supply means and a body side circuit for performing digital information communication, comprising:

(a) electric power receiving means for receiving an electric power from said electric power supply means when attached to said optical instrument body;
(b) an accessory side circuit for performing digital information communication with said body side circuit, said accessory side circuit being arranged to change over between a first state of consumption of electric current and a second state of a lower consumption of electric current than in said first state; and
(c) a control circuit for controlling said state concerning the consumption of electric current of said accessory side circuit, said control circuit being arranged to change said state from said first state to said second state when said body side circuit and said accessory side circuit do not perform digital communication for more than a predetermined time.

18. An accessory according to claim 17, wherein wherein said control circuit returns said state to said first state again when said body side circuit and said accessory side circuit has performed digital communication after said state has been changed to said second state.

19. An accessory according to claim 17, wherein said accessory side circuit includes a computer, said computer being arranged to change over between a first state of consumption of electric current and a second state of a lower consumption of electric current than in said first state.

20. An accessory according to claim 19, wherein said computer includes a clock signal generating circuit, said second state being obtained by a stoppage state of oscillation of said clock signal generating circuit, and said first state being obtained by a state of oscillation.

21. An accessory according to claim 17, further comprising:
a motor serving as a drive source for an optical operation, said motor receiving said electric power directly from said electrical power receiving means.

22. An accessory according to claim 21, wherein said accessory side circuit includes a drive circuit for controlling the driving of said motor, and wherein a supply of current to said drive circuit is stopped in said second state.

23. A system according to claim 1, wherein said optical instrument body is a camera body.

24. A system according to claim 6, wherein said optical instrument body is a camera body.

25. An accessory according to claim 11, wherein said optical instrument body is a camera body.

26. An accessory according to claim 17, wherein said optical instrument body is a camera body.

27. A system according to claim 23, wherein said optical accessory instrument is an interchangeable lens.

28. A system according to claim 24, wherein said optical accessory instrument is an interchangeable lens.

29. An accessory according to claim 25, wherein said optical accessory instrument is an interchangeable lens.

30. An accessory according to claim 26, wherein said optical accessory instrument is an interchangeable lens.

31. A system according to claim 1, wherein said supply means includes a supply circuit for supplying said electric power and an electric connecting member for supplying said electric power to said optical accessory instrument.

32. A system according to claim 6, wherein said supply means includes a supply circuit for supplying said electric power and an electric connecting member for supplying said electric power to said optical accessory instrument.

33. An optical accessory instrument according to claim 11, wherein said electric power supply means includes a supply circuit for supplying said electric power and an electric connecting member for supplying said electric power to said optical accessory instrument.

34. An optical accessory instrument according to claim 17, wherein said electric power supply means includes a supply circuit for supplying said electric power and an electric connecting member for supplying said electric power to said optical accessory instrument.

* * * * *

UNITED STATES PATENT AND TRADEMARK OFFICE
CERTIFICATE OF CORRECTION

PATENT NO. : 4,922,283
DATED : May 1, 1990
INVENTOR(S) : Hajime FUKUI

It is certified that error appears in the above-identified patent and that said Letters Patent is hereby corrected as shown below:

COLUMN 2:

Line 27, "shows" should read --show--.

COLUMN 8:

Line 59, "provided operate" should read --provided to operate--.

COLUMN 11:

Line 31, "an" should read --on--.

COLUMN 13:

Line 33, "a" should be deleted.

UNITED STATES PATENT AND TRADEMARK OFFICE
CERTIFICATE OF CORRECTION

PATENT NO. : 4,922,283

DATED : May 1, 1990

INVENTOR(S) : Hajime Fukui

It is certified that error appears in the above-identified patent and that said Letters Patent is hereby corrected as shown below:

Column 16:

Line 21, "wherein" should be deleted.

Signed and Sealed this

Fourth Day of February, 1992

Attest:

HARRY F. MANBECK, JR.

*Attesting Officer*　　　　　*Commissioner of Patents and Trademarks*